(12) United States Patent
Campbell

(10) Patent No.: US 6,759,757 B1
(45) Date of Patent: Jul. 6, 2004

(54) METHOD AND APPARATUS FOR CONVERTING TIDAL POWER INTO ELECTRICAL ENERGY

(75) Inventor: Steven Campbell, P.O. Box 733, St. John's, Newfoundland (CA), A1C 5L4

(73) Assignee: Steven Campbell, St. John's (CA)

( * ) Notice: Subject to any disclaimer, the term of this patent is extended or adjusted under 35 U.S.C. 154(b) by 2 days.

(21) Appl. No.: 10/464,511

(22) Filed: Jun. 19, 2003

(51) Int. Cl.[7] ............................ F03B 13/26; F03B 13/12
(52) U.S. Cl. ............................ 290/54; 290/53; 290/42; 290/43
(58) Field of Search .................. 290/53, 54, 42, 290/43

(56) References Cited

U.S. PATENT DOCUMENTS

| | | | | |
|---|---|---|---|---|
| 4,001,596 A | | 1/1977 | Kurtzbein | 290/53 |
| 4,511,808 A | | 4/1985 | Jöst | 290/54 |
| 4,625,124 A | * | 11/1986 | Ching-An | 290/42 |
| 4,717,831 A | * | 1/1988 | Kikuchi | 290/53 |
| 5,009,568 A | * | 4/1991 | Bell | 415/3.1 |
| 5,430,332 A | | 7/1995 | Dunn, Jr. | 290/54 |
| 5,440,175 A | | 8/1995 | Mayo, Jr. et al. | 290/54 |
| 6,208,037 B1 | | 3/2001 | Mayo, Jr. et al. | 290/54 |

FOREIGN PATENT DOCUMENTS

| | | | | |
|---|---|---|---|---|
| CA | 2366043 | * | 6/2003 | F03B/13/26 |
| JP | 62070667 | * | 4/1987 | F03B/13/26 |
| JP | 2002310054 | * | 10/2002 | F03B/13/26 |

* cited by examiner

Primary Examiner—Nicholas Ponomarenko
Assistant Examiner—Heba Elkassabgi
(74) Attorney, Agent, or Firm—Paul S. Sharpe; Ogilvy Renault

(57) ABSTRACT

There is disclosed a caisson and a method of using same. The caisson is for creating electrical power from a tidal stream. The power may be used to create hydrogen for hydrogen fuel cells. The device includes a body having an inlet and an outlet to allow the passage of water therethrough. A compartment extends between the inlet and the outlet and provides at least one paddle wheel rotatably mounted within the compartment for contact with incoming water. The compartment may be pressurized to reduce the volume of water present in the compartment when the caisson is submerged in the stream. The paddle wheel is connected to suitable pumps and generators in order to harness the energy from the mechanical energy created by the paddle wheel.

16 Claims, 6 Drawing Sheets

METHOD AND APPARATUS FOR CONVERTING TIDAL POWER INTO ELECTRICAL ENERGY

FIELD OF THE INVENTION

The present invention relates to a method and apparatus for converting tidal power into electrical energy and more particularly, the present invention relates to caisson type device having a paddle wheel which may be variably positioned within a tidal stream.

BACKGROUND OF THE INVENTION

As the moon orbits around the earth, the gravitational force of the moon and sun pull the oceans creating the tides. It is undoubtedly the most powerful active force on earth. An immense amount of energy is inherent in these large bodies of moving water. To harness a small fraction of this energy and convert it into electricity, many innovative methods have been conceived.

The net energy in a tidal stream is very large. When a tidal stream is restricted by two points of land, the velocity is increased considerably, condensing the net energy through the constricting points of land. To extract a significant amount of energy from this relatively slow moving body of water, a large cross-section of the tidal stream needs to be harnessed. The simplest way to achieve this goal is through the use of a large paddle wheel or underwater sail. The energy extracted is directly proportional to the size of the paddle wheel.

For a paddle wheel to operate efficiently, only the lower half of the wheel should be submerged below the surface of the water, leaving the upper half of the wheel exposed to surface elements such as wind and waves. The paddle wheel structure need also contend with surface conditions such as slab ice and floating debris.

A housing may be constructed to protect the paddle wheel(s) but this would add considerable height, cost and complexity to a potential structure. A housing would also elevate the centre of gravity, a characteristic not conducive to stability during tow-out and transportation operations. As well, to protect the paddle wheel from floating debris, the housing would have to protrude below the surface of the water, restricting the flow of water to the paddles.

The most restrictive characteristic of a large structure protruding through the surface of the water is that it creates a barrier against surface ice flow. This can be disastrous, as the force behind a restricted ice flow can be fatal. With river ice, restricting the flow can mean serious flooding upstream. Marine structures that encounter ice are generally designed to minimize resistance. With the type of structure noted above, this would not be possible.

In numerous cases, the fastest (higher energy) tidal streams are found where large bodies of water are fully or partially enclosed by land except for one or more openings to the sea. In a lot of these cases, it would be desirable to link the two or more points of land adjacent to the openings. Often, the depth of water or span at the opening does not make a conventional bridge feasible. The preferred embodiment is intended to generate electricity at these tidal stream openings as well as potentially provide the base foundations for such a bridge.

The original and simplest method of harness sing tidal power was a barrage and paddle wheel. Subsequently, many intricate methods using a differential of water elevations have been devised. In recent years, barrage of coastal waters has elicited considerable public opposition. Barrage restricts recreational activities and commercial traffic. Due to the growing opposition, the focus of harnessing tidal power has shifted to tidal streams and non-coastal barrage systems. This shift has introduced new challenges and obstacles, as tidal streams are generally found in deeper and more treacherous waters. Structures built at such locations are susceptible to ocean storms, slab ice and icebergs. There have been systems developed to harness tidal streams in ice-free locations that are relatively sheltered. Unfortunately, no arrangement capable of withstanding the environmental forces of icebergs, slab ice and severe ocean storm waves has become available.

In the prior art a wide variety of devices have been proposed. Typical of the arrangements is referenced in U.S. Pat. No. 4,717,831, issued Jan. 5, 1988, to Kikuchi. In the document a power generator is disclosed. The generator provides a plurality of paddle wheels fixed in place essentially immovable and exposed without any coverage from debris. It would therefore appear that the Kikuchi system would be vulnerable to damage if used in more extreme environments.

Mayo, Jr., in U.S. Pat. No. 6,208,037, issued Mar. 27,2001, provides a power generating system which is also a permanent structure and is designed for fixture within a waterway. Generally speaking, these systems are cumbersome, expensive and require the use of one or more operators.

U.S. Pat. No. 5,440,175, issued to Mayo, Jr. et al., Aug. 8, 1995, discloses a river bridge electrical generator unit. This unit is, similar to those discussed above, for barrage and thus does not overcome the limitations outlined in the discussion herein previously.

Other references in the realm of the present invention include U.S. Pat. Nos. 5,430,332, 4,511,808, and 4,001,596.

In view of the state of the art in this niche of civil engineering, there exists a distinct need for a versatile, durable and relocatable tidal power system which is absent the disadvantages connected with the current devices. The present invention addresses the requirements for a high-performance system for efficient extraction of the energy inherent in tides.

SUMMARY OF THE INVENTION

One object of the present invention is to provide a caisson for creating electrical power from a tidal stream, comprising:
- a body having an inlet and an outlet to allow the passage of water there through;
- a compartment extending between the inlet and the outlet;
- at least one paddle wheel rotatably mounted within the compartment for contact with incoming water;
- means for pressurizing the compartment to reduce the volume of water present in the compartment when the caisson is submerged in the stream;
- pump means connected with the at least one paddle wheel; and
- generator means connected to the pump means for generating electrical power.

The generated power may also then be used to create hydrogen for hydrogen fuel cells.

A further object of the present invention is to provide a method of converting mechanical energy from tidal motion to electrical energy, comprising:
- providing a movable paddle wheel within an enclosure, the enclosure having an inlet and an outlet for facilitating contact of the paddle wheel with a tidal stream;

connecting the paddle wheel to means for converting energy created during rotation of the paddle wheel to electrical energy;

positioning the paddle wheel into contact with the stream;

selectively pressurizing the enclosure to alter the level of submersion of the paddle wheel in the water within the enclosure; and collecting energy created from the tidal motion of the paddle wheel.

Having thus described the invention, reference will now be made to the accompanying drawings illustrating preferred embodiments.

BRIEF DESCRIPTION OF THE DRAWINGS

Similar numerals used in the specification denote similar elements.

DETAILED DESCRIPTION OF THE PREFERRED EMBODIMENTS

Figure 1:
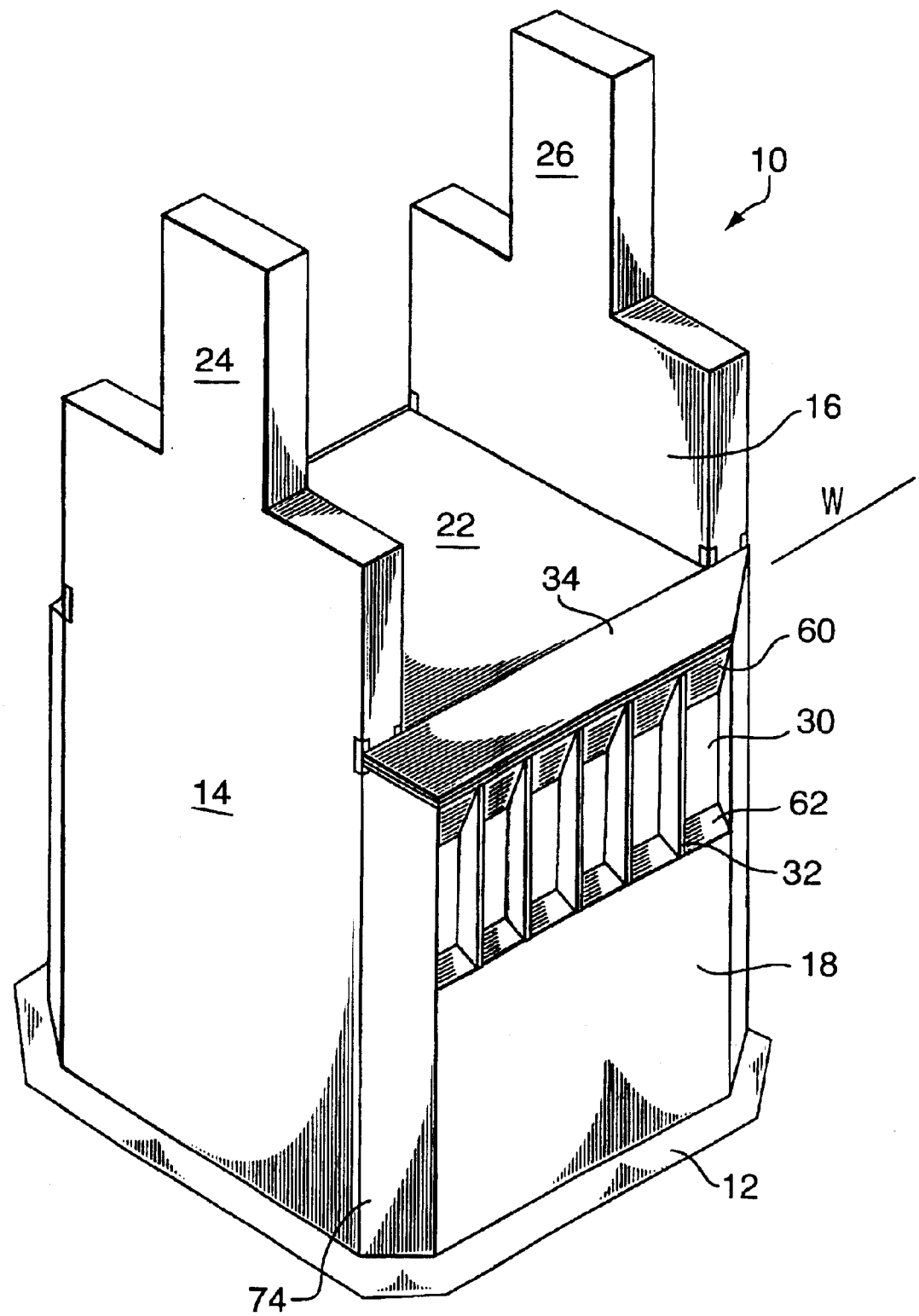
FIG. 1 is a perspective view of the apparatus according to one embodiment in the present invention.
Figure 2:
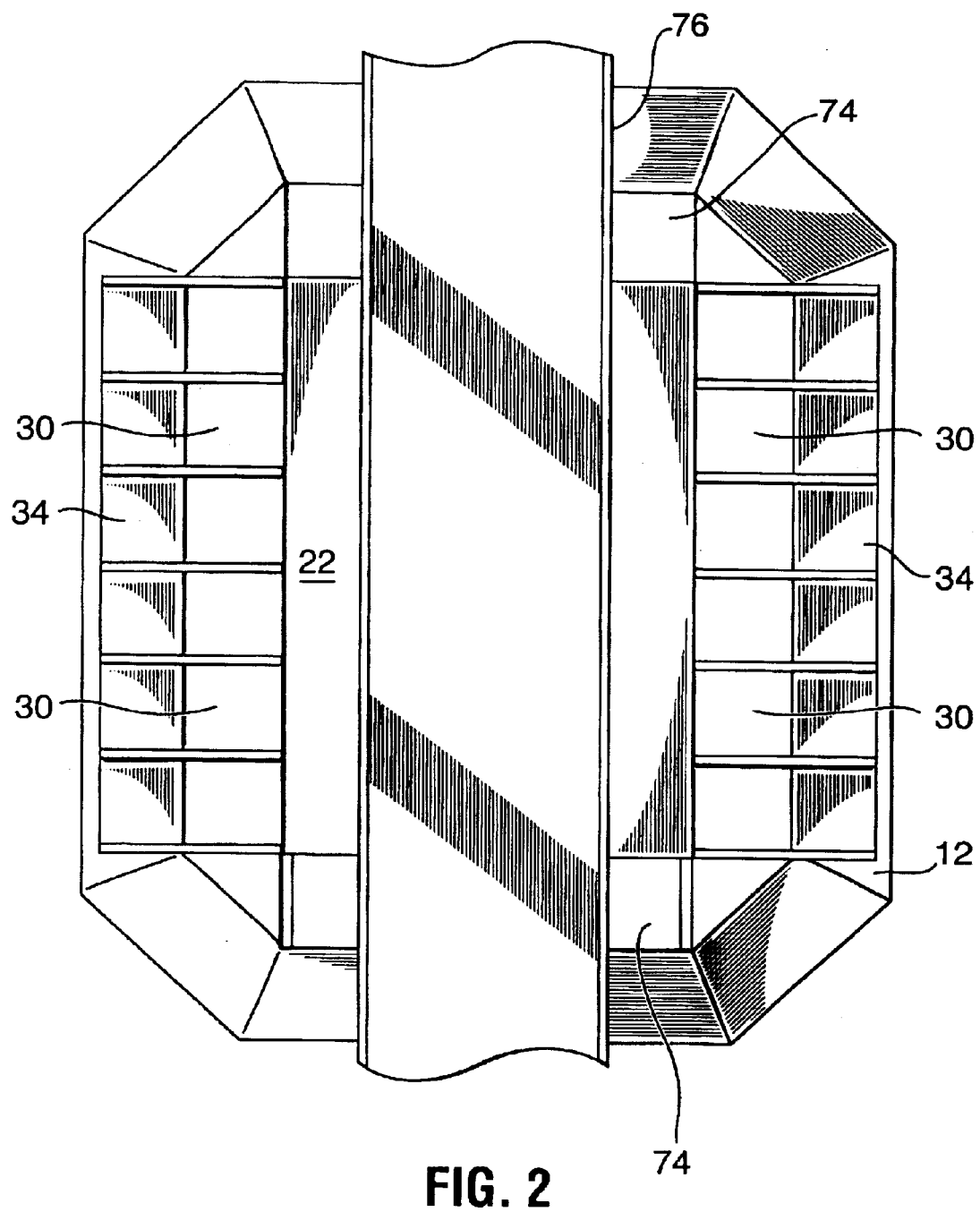
FIG. 2 is a plan view of the arrangement as positioned with a bridge deck.

Referring now to the drawings, and in particular FIGS. 1 through 4, shown is one embodiment of the present invention where numeral 10 denotes the overall structure. In FIG. 1, the body includes a base 12, spaced apart side walls 14 and 16 and front wall 18 and rear wall 20. A top wall 22 is provided with bridge truss members 24 and 26. As illustrated in the drawings, the arrangement effectively provides a base portion, intermediate portion and a top portion.

Figure 4:
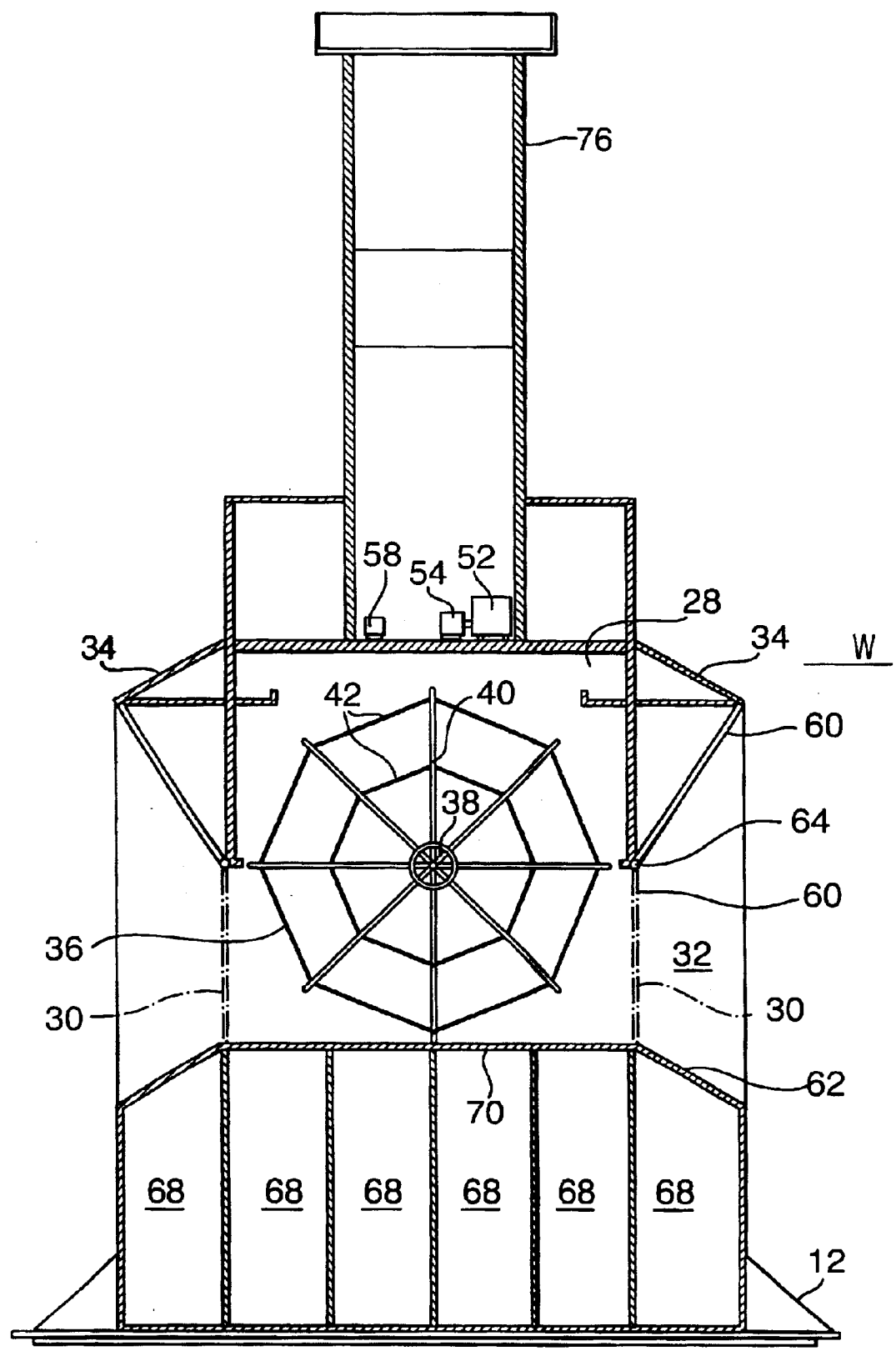
FIG. 4 is a cross-section of the apparatus.
Figure 5:
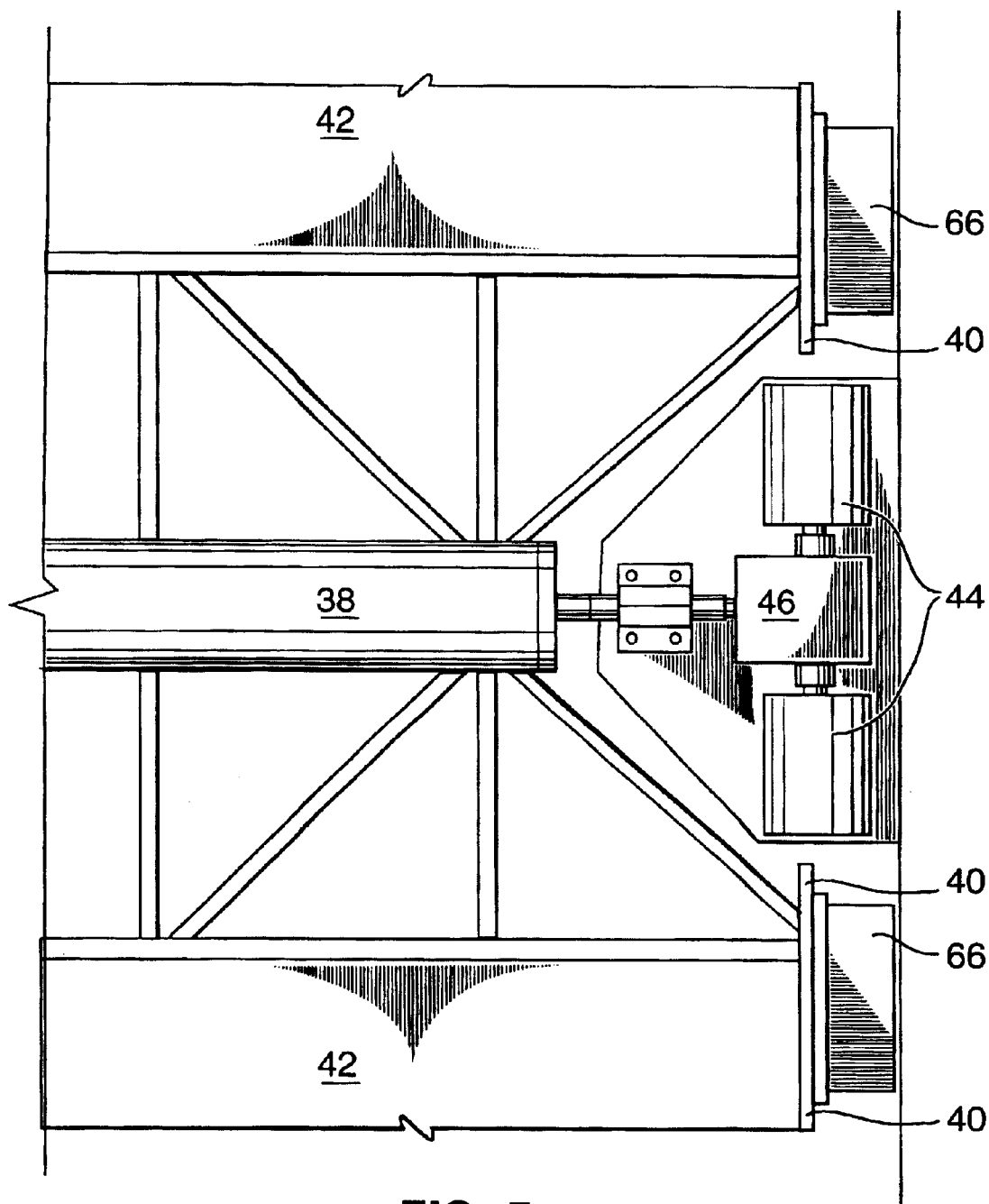
FIG. 5 is a plan view of the access support and hydraulic drive system.

In greater detail, the structure 10 provides an internal volume or compartment 28 which is shown best in FIG. 4. Intermediate of the structure 10 is a series of portals 30 which permit a tidal stream to pass through the compartment 28 from one side to the other. The portals 30 are defined by a plurality of spaced apart fins 32 which act as means for directing the tidal stream into the internal volume 28 of the structure 10 and also additionally provide structural support for the opening within which they are positioned. The top wall 22 includes a downwardly directed wall 34. Wall 34 is oriented about the perimeter of the structure and, when the structure 10 is positioned in the water according to one embodiment, the downwardly directed wall 34 contacts the water line, generally denoted by W. In this manner, when the arrangement is positioned in situ within the water, packed ice flow and slabs of ice (not shown) are pushed onto and across top wall 22. Accordingly, packed slab ice is not restricted by the relatively large structure. This significantly reduces the lateral force applied the structure 10 by ice flows.

Wall segment 34 cooperates with the individual fins 32 to prevent large debris from entering into the compartment 28 which would otherwise damage or impair the function of the paddle wheel 36.

Paddle wheel 36 rotates about a transverse access relative to the vertical orientation of the device about axis 38 and includes a plurality of radially spaced apart support members 40. A flexible material 42 extends between the supports 40.

As water flows through the structure 10, the force slowly rotates paddle wheel 36 and therefore creates a torque on axis 38. In order to convert the axial torque into electricity, hydraulic pumps 44 are connected to the axis 38 through a transfer case 46 on both sides of the axis 38. The axis 38 of the paddle wheel 36 and the hydraulic pumps 44 are supported on a frame 50 (shown in FIG. 6), which frame 50 is secured internally of compartment 28 and in particular to one of walls 14 or 16. This fixes the elevation of the paddle wheel 36. Adjustment of the elevation of the wheel axis in the sea water is achieved by alternate means discussed hereinafter.

The hydraulic pressure from each of the hydraulic pumps 44 is combined to drive at least one electric generator 52 through a hydraulic drive motor 54. The drive motors 54 and the generators 52 are positioned above water level, W, for purposes of safety. It is well known by those skilled in the art as to the mechanism of conversion of axial torque to electricity.

In view of the alternating flow pattern of a tidal stream, the hydraulic pumps 44 are constructed such that positive hydraulic pressure is created independent of paddle wheel 36 direction. The crankshaft of the pump (not shown) typically would drive one or more pistons whereby a spring loaded supply valve (not shown) typically controls hydraulic fluids supplied to each piston. When the piston is extracted, the negative pressure opens the supply valve (not shown) and the hydraulic fluid is drawn into the cylinder (not shown). During compression, the spring loaded valve (in the other direction) allows the pressurized fluid to flow into the pressure manifold (not shown). Accordingly, each cycle pressurizes hydraulic fluid regardless of the crank shaft direction. These principals are well known to those skilled in the art.

One of the most attractive features with the instant structure 10 relates to the feature of lowering the resistance of the water on paddle wheel 36 above axis 38. In order to achieve this result, and particularly, the resistance of the water on paddle wheel 36 above axis 38, the water level inside the compartment 28 may be lowered to just below axis 38. This is achieved by pressurizing compartment 28 with air. To this end, an air compressor 58 is provided to compress the air to the pressure equal to that of the water head pressure at the axis depth. Generally speaking, the air pressure required is approximately half that required to inflate a conventional automobile tire. In order to contain the pressurized air in the compartment 28, portals 30 are positioned together with the wall segment 34 to be just below the desired level of water, W, in compartment 28. Once the water level is lowered to the desired point, further compression is only required to replace air that escapes through the roof and wall or into the water.

As mentioned herein previously, the fins 32 are useful to guide water into the compartment 28 of structure 10. To this end, and in order to further assist in guiding water into compartment 28, each portal may include a angularly disposed wall, broadly denoted by numeral 60 at the upper end of the portal and a further angulary inclined wall 62 at the bottom end the portal and at the top end of wall 18. In this manner, a narrowing of the opening of the portal is achieved and, as is well known in the art, this provides an increase in the velocity of the tidal stream entering the compartment 28 and thus increases the angular velocity of paddle wheel 36.

With respect to the segment 60, this is preferably a hingedly connected wall or gate which, in the example, is hingedly connected above portal 30 at 64. It will be understood that each of the portals will include the hingedly connected segment 60 which may be moved from the location as shown in FIG. 4 to a second position shown in chain line where the wall 60 is swung outwardly. This permits closure of the respective portal for maintenance of the paddle wheel 36 and compartment 28.

As discussed herein previously, the paddle wheel 36 preferably incorporates a high strength fabric held snugly within frame members 40 to achieve a underwater sail. As a preferred feature, the fabric will be held tautly near the axis, but slack at the outer edge of the wheel. This facilitates water flow out of the fabric paddle as it lifts out of the water. The slack end may optionally be weighted so that on reentry, the outer edge of the fabric paddle enters the water first and reduces drag on the wheel in the first few meters.

Figure 6:
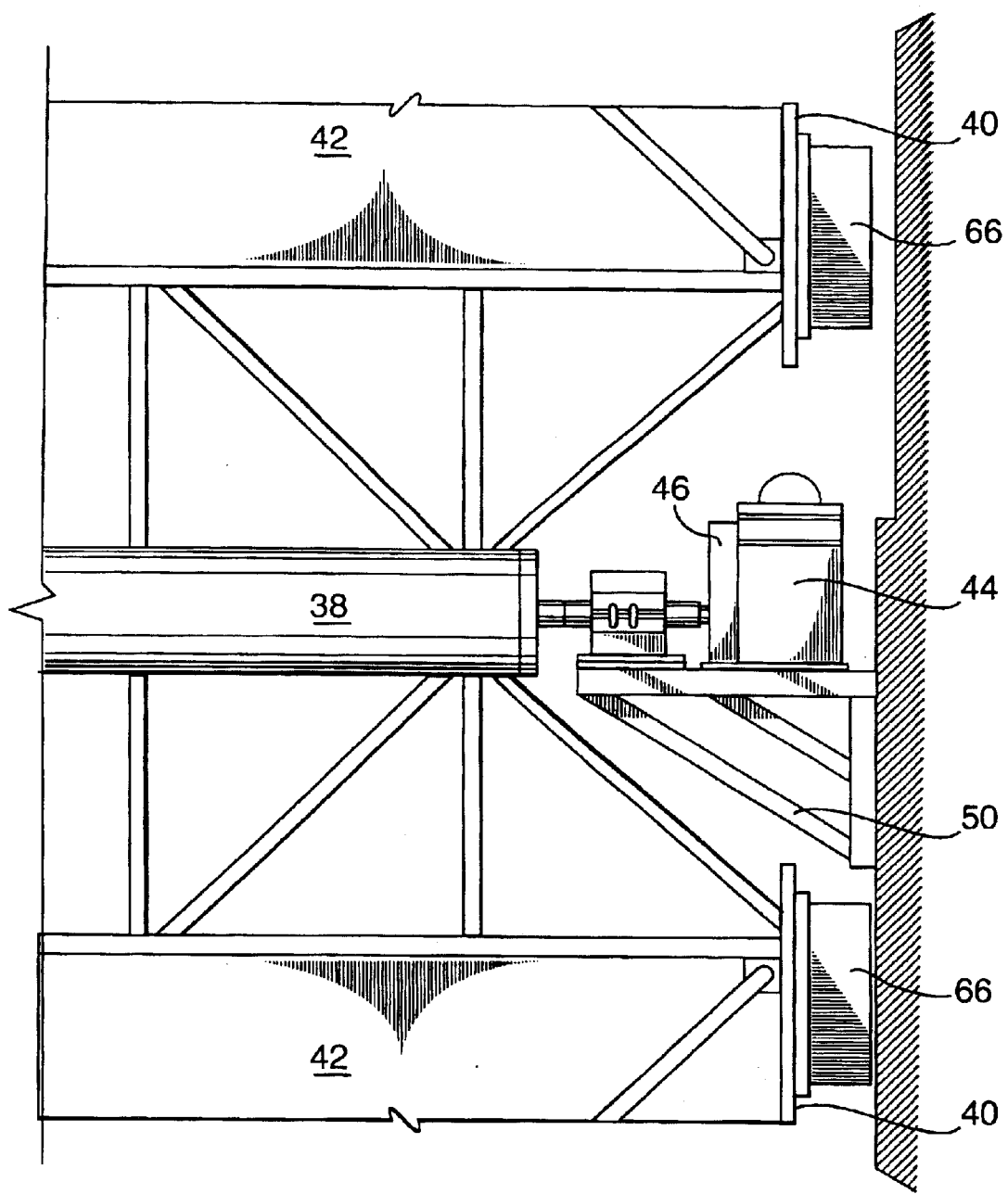
FIG. 6 is a side elevation view of the access support hydraulic drive system.

As a further advantageous feature, in order to reduce water flow from the sides of the paddle wheel 36, each frame 40 may be fitted with a flexible edge 66 shown in FIG. 6. This arrangement is useful for brushing the edges of the walls.

Depending upon the final intended use of the structure 10, the same may be fixedly secured to the bedrock sea floor (not shown) or simply be gravity based when installed. Once installed, a plurality of individual ballast cells 68 bounded by the base wall 12 and walls 70 of compartment 28 may be charged with solid ballast in order to increase the overturning movement of resistance of the structure. Depending on the environment in which the arrangement is used.

Figure 3:
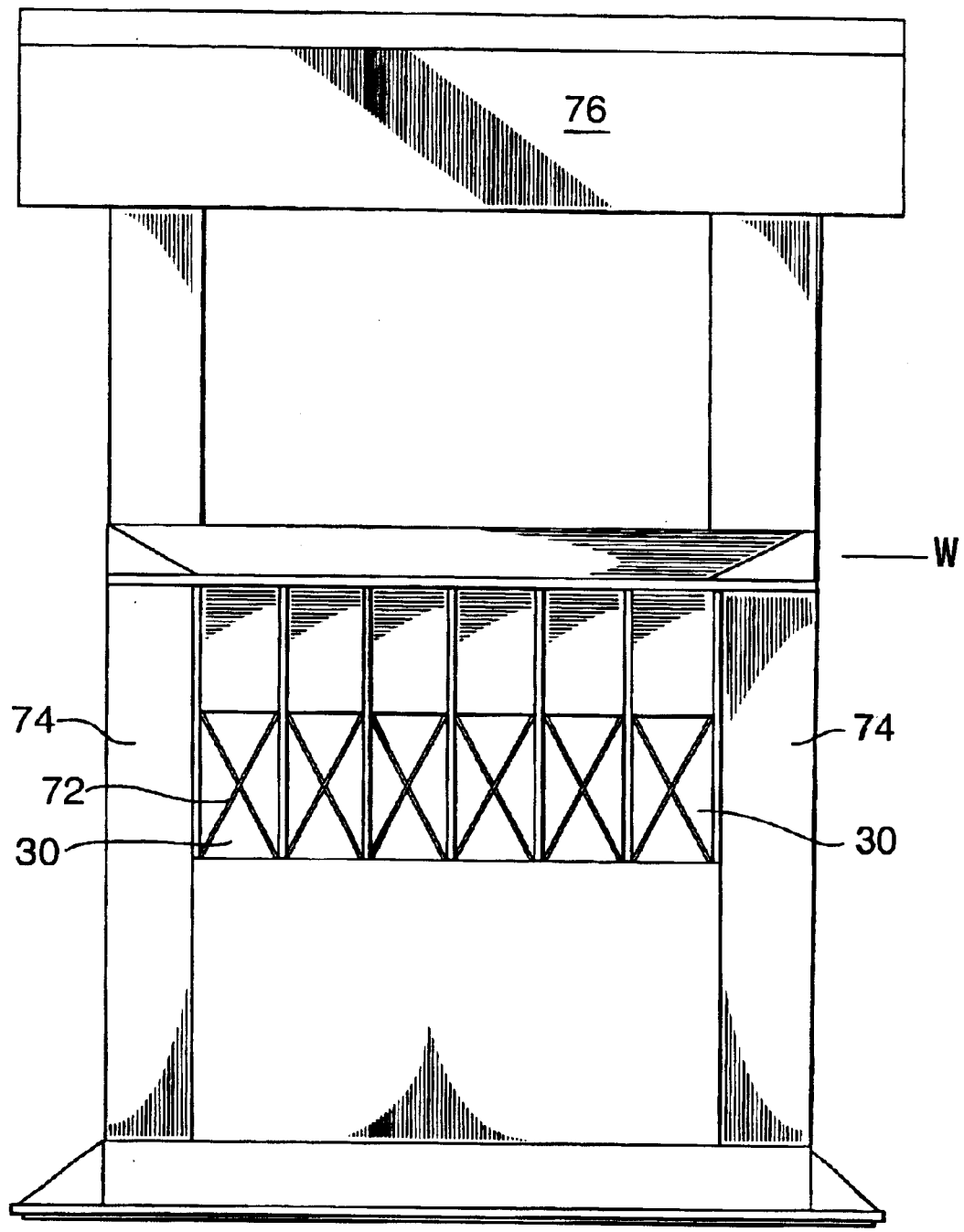
FIG. 3 is a front elevation view of the arrangement shown in FIG. 1.

For further support, the portals 30 may include x-braces 72 shown best in FIG. 3, for further structural stability, the side chambers 74 of the structure can act as buoyancy chambers. Once the structure 10 has been installed in its environment, the chambers may then be filled with ballast to further increase the overturning moment of resistance. The chambers 74 are designed to provide lateral sheer and thus structural stability to the structure. The side chambers thus transfer lateral sheer from the upper to the lower section of the structure and this is further supported by tubular bracing 72 which contributes to the overall structural integrity of the device.

Remaining on the discussion of FIG. 3, shown is the structure as it would support an independent bridge truss 76. In this manner, the structure could be used as a bridge column foundation and allow for the transportation of vehicles. As discussed herein previously, supports 24 and 26 extending upwardly from wall 22 act as supports for the truss.

It will be understood that the wall 22 of the structure 10 has to be capable of with standing significant air pressure within compartment 28 and additionally the force of ice slabs (not shown) sliding over the top. In a preferred embodiment, the construction material would comprise reinforced concrete.

It will be understood that any number of the structures may be connected together to act as a tidal fence and further that the individual arrangements may be used as bridge supports.

Although embodiments of the invention have been described above, it is not limited thereto and it will be apparent to those skilled in the art that numerous modifications form part of the present invention insofar as they do not depart from the spirit, nature and scope of the claimed and described invention.

I claim:

1. A caisson for creating electrical power from a tidal stream, comprising:

a body having an inlet and an outlet to allow the passage of water there through;

a compartment extending between said inlet and said outlet, wherein each of said inlet and said outlet include a plurality of spaced apart fins for directing flow of said stream into said compartment;

at least one paddle wheel rotatably mounted within said compartment for contact with incoming water;

pressurizing means for pressurizing said compartment to reduce the volume of water present in said compartment when said caisson is submerged in said stream;

pump means connected with said at least one paddle wheel; and generator means connected to said pump means for generating electrical power.

2. The apparatus as set forth in claim 1, wherein said body includes a door connected to each of said inlet and said outlet selectively operable between an open position where said stream may flow through to a closed position where flow is prevented.

3. The apparatus as set forth in claim 1, wherein each of said inlet and said outlet include diversion means for diverting debris away from said body and said compartment.

4. The apparatus as set forth in claim 3, wherein diversion means comprises a peripheral shield extending downwardly about a top portion of each of said inlet and said outlet.

5. The apparatus as set forth in claim 1, wherein said body includes a plurality of ballast compartments for adjusting the center of gravity of said body.

6. The apparatus as set forth in claim 5, wherein said body is configured substantially rectangularly having a top section, intermediate section and base section.

7. The apparatus as set forth in claim 6, wherein said body includes buoyancy chambers.

8. The apparatus as set forth in claim 6, wherein said intermediate section includes said compartment.

9. The apparatus as set forth in claim 6, wherein said top section includes said pump means, said generator means and said means for pressurizing said compartment.

10. The apparatus as set forth in claim 1, wherein said paddle wheel includes a plurality of radially spaced apart paddles, each paddle having a frame and flexible material extending between said frame.

11. A method of converting mechanical energy from tidal motion to electrical energy, comprising:

providing a movable paddle wheel within an enclosure, said enclosure having an inlet and an outlet for facilitating contact of said paddle wheel with a tidal stream;

said inlet and outlet each include a plurality of spread apart fins for directing flow of said stream;

ballasting said enclosure for stability;

connecting said paddle wheel to means for converting energy created during rotation of said paddle wheel to electrical energy;

positioning said paddle wheel into contact with said stream; pressurizing means for selectively pressurizing said enclosure to alter the level of submersion of said paddle wheel in said water within said enclosure; and collecting energy created from said tidal motion of said paddle wheel.

12. The method as set forth in claim 11, further including using generated electrical power to create hydrogen for hydrogen fuel cells.

13. The method as set forth in claim 11, further including altering the buoyancy of said enclosure.

14. The method as set forth in claim 11, further including connecting a plurality of enclosures in spaced relation.

15. The method as set forth in claim 11, further including connecting said paddle wheel to hydraulic pump means.

16. The method as set forth in claim 15, further including connecting said hydraulic pump means to electrical generation means.

* * * * *